United States Patent [19]

Jacobson

[11] 3,818,141

[45] June 18, 1974

[54] CONTROL CIRCUIT FOR TELEPHONE ANSWERING DEVICE

[76] Inventor: Sava Jacobson, 8130 Orion St., Van Nuys, Calif. 91406

[22] Filed: May 19, 1972

[21] Appl. No.: 254,924

[52] U.S. Cl. .................................. 179/6 R, 179/2 A
[51] Int. Cl. .............................................. H04m 1/64
[58] Field of Search.......... 179/6 R, 6 AC, 6 C, 6 E, 179/2 R, 2 A, 84 R, 84 A

[56] References Cited

UNITED STATES PATENTS

| | | | |
|---|---|---|---|
| 3,485,952 | 12/1969 | Walker | 179/2 A |
| 3,499,993 | 3/1970 | Owen | 179/6 AC |
| 3,586,779 | 6/1971 | Chernack | 179/6 R |
| 3,592,968 | 7/1971 | Ogawa | 179/6 R |
| 3,689,890 | 9/1972 | Jensen | 179/2 A |

*Primary Examiner*—Raymond F. Cardillo, Jr.
*Attorney, Agent, or Firm*—Flam & Flam

[57] ABSTRACT

The answering cycle of a telephone answering device is initiated by a solid state circuit responsive to a ringing signal. The rectified ringing signal charges a triggering capacitor to a level sufficient to turn on a controlled rectifier. Conduction of the controlled rectifier effectively connects an inductor as a load across the telephone line, and biases on a transistor to switch power to the motor, amplifier and other components of the answering device. At the end of the answering cycle the controlled rectifier is turned off, thereby unloading the telephone line and disconnecting power from the answering device. Operation of the answering device is inhibited when insufficient tape remains for recording additional incoming messages.

12 Claims, 6 Drawing Figures

CONTROL CIRCUIT FOR TELEPHONE ANSWERING DEVICE

BACKGROUND OF THE INVENTION

1. Field of the Invention

The present invention relates to solid state circuitry useful for turning on a telephone answering device in response to occurrence of a telephone ringing signal and for turning off the device at the end of the answering cycle.

2. Description of the Prior Art

In a telephone answering device, detection of a ringing signal causes a prerecorded announcement to be transmitted over the telephone line. The announcement may request the caller to leave a message which is recorded by the device on an incoming message tape. At the end of the answering cycle the device returns to the standby state, ready to receive the next call. In certain answering devices, the outgoing announcement is precorded on an endless magnetic tape loop which also functions to provide cycle timing.

In most prior art telephone answering devices, the ringing signal actuates a relay which connects power to the drive motor, amplifier and other circuitry of the device. The relay also may connect an inductive load across the telephone line to simulate the telephone off-hook condition. Latching circuitry typically is provided to keep the relay closed until the end of the answering cycle.

An electromechanical relay lacks the reliability of solid state circuitry. Further, a relay is a relatively expensive component undesirable in low-cost telephone answering devices. Accordingly, one object of the present invention is to provide a simple, inexpensive, solid-state control circuit for initiating and terminating the answering cycle of a telephone answering device without the use of a relay.

Another shortcoming of prior art, inexpensive telephone answering devices relates to the amount of magnetic tape available to record incoming messages. If many calls are received prior to playing back the recorded messages, the entire supply of tape may be used up, leaving no tape for recording additional incoming messages. When this occurs, it is preferable to disable the telephone answering device and have the telephone go unanswered, rather than lose an incoming message for lack of recording space. Another object of the present invention is to provide means for so disabling a telephone answering device.

Although not so limited, the present invention is particularly useful in conjunction with a low-cost telephone answering device of the type described in the inventor's co-pending U.S. application, Ser. No. 195,400 entitled TELEPHONE ANSWERING APPARATUS, now U.S. Pat. No. 3,780,226.

SUMMARY OF THE INVENTION

These and other objectives are achieved by providing a solid state control circuit including a rectifier bridge connected across the telephone line. A triggering capacitor is charged by the output of the rectifier bridge. Upon occurrence of a ringing signal, the charge on the triggering capacitor will exceed a level sufficient to fire a neon lamp and thereby turn on a silicon controlled rectifier (SCR) or other semiconductive switching device. The SCR is connected in series with an inductor and one junction of a transistor across the bridge output. With this arrangement, the dc bias on the telephone line maintains conduction of the SCR during the answering cycle, and the inductor effectively loads the telephone line to simulate an off-hook condition. Power from a battery or other source is connected to the motor, amplifier and other components of the telephone answering device via the emitter-collector path of the transistor, which is switched on when the SCR is conducting.

At the end of the answering cycle, a control member such as a conductive strip on the outgoing message tape loop shorts a set of contacts. This completes a circuit to discharge a capacitor across the SCR with appropriate polarity so as to terminate conduction of that device. As a result, the inductive load is disconnected from the telephone line and the transistor switches off power to the answering device circuitry. No relay is used in the inventive control circuit.

The end of the magnetic tape used to record incoming messages also is provided with a conductive strip. When incoming calls have been recorded on the entire supply of tape, this conductive strip closes a set of contacts. The closed contacts cooperate with the inventive control circuit to prevent power from being connected to the answering device. Subsequent answering of incoming calls is inhibited.

BRIEF DESCRIPTION OF THE DRAWINGS

A detailed description of the invention will be made with reference to the accompanying drawings wherein like numerals designate corresponding elements in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figures 1, 2, 3, 4, 5:
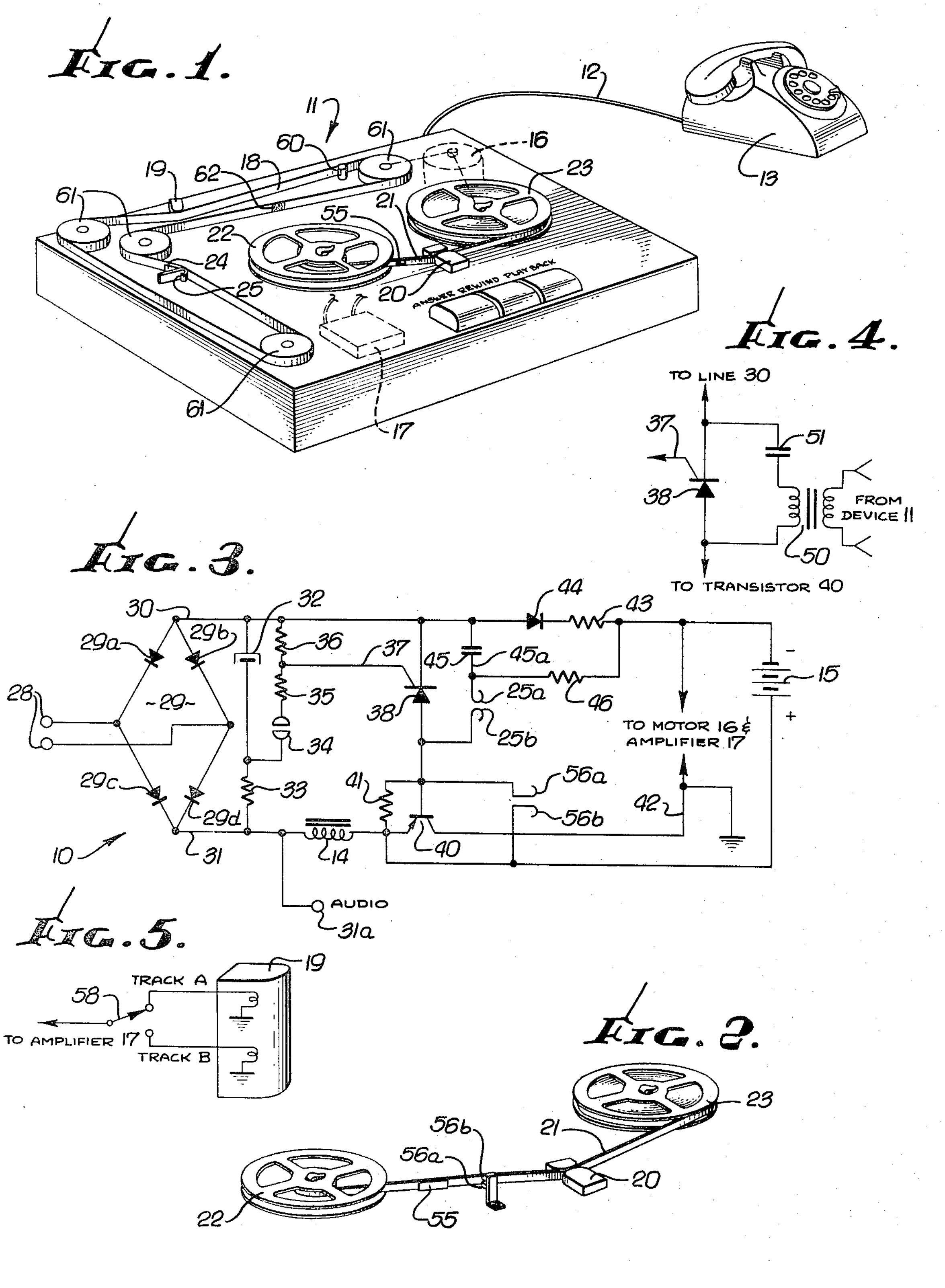
FIG. 1 is a pictorial view of a typical telephone answering device incorporating the inventive control circuit.
FIG. 2 is a fragmentary perspective view of the conductive strip and contact arrangement associated with the incoming message recording tape.
FIG. 3 is an electrical schematic diagram of control circuitry in accordance with the present invention.
FIG. 4 is an electrical schematic diagram of an alternative circuit for turning off the SCR of FIG. 3.
FIG. 5 is a diagrammatic view of a two track record/-playback head useful with the announcement tape loop of FIG. 1.

Referring now to the drawings, the inventive control circuit 10 (FIG. 3) advantageously is employed in a telephone answering device 11 (FIG. 1). Occurrence of a ringing signal on the line 12 to a telephone 13 causes the circuit 10 to initiate an answering cycle. To this end, the circuit 10 effectively connects an inductor 14 across the line 12 to simulate a telephone off-hook condition. The circuit 10 also connects power from a battery 15 to a motor 16 and an amplifier 17 in the device 11.

An announcement prerecorded on a portion of an endless magnetic tape loop 18 is transmitted via a playback head 19 and the amplifier 17 to the telephone line 12. Typically the announcement will request the caller to leave a message, which then is recorded via a record/playback head 20 onto a magnetic tape 21. The tape 21 is supplied from a reel 22 and accumulated on a take-up reel 23.

Both the announcement tape loop 18 and the incoming message recording tape 21 are driven continuously throughout the answering cycle by the motor 16. The tape loop 18 contains a conductive metal segment 24. At the end of the answering cycle, the conductive segment 24 reaches a contact assembly 25 and shorts a pair of contacts 25*a*, 25*b* (FIG. 3) mounted on the assembly 25. As described below, this causes the circuit 10 to remove the inductive load 14 from the telephone line 12 and to disconnect the battery 15 from the motor 16 and the amplifier 17, thus terminating the answering cycle.

The telephone line 12 is connected via a pair of terminals 28 (FIG. 3) to the input of a rectifier bridge 29 including four diodes 29*a* – 29*d*. The purpose of the bridge 29 is to define voltage polarity. Thus the bridge output line 30 always will be negative and the output line 31 always will be positive regardless of the telephone line polarity. A single rectifier (not shown) could be used instead of the bridge 29, however this would require connection of the telephone line with a polarity corresponding to that of the rectifier.

Normally a dc bias is present at all times on the telephone line 12. This bias charges a capacitor 32 via a resistor 33 to a voltage level (typically 48 volts) insufficient to fire a neon lamp 34. The charge on the capacitor 32 remains at this level during the standby period prior to receipt of an incoming call.

The ac ringing signal, superimposed on the dc bias, is rectified by the bridge 29. Thus upon receipt of a ringing signal, the voltage across the capacitor 32 will increase to a value (typically 70 volts) sufficient to fire the neon lamp 34. When this occurs, the capacitor 32 will discharge via the lamp 34 and a pair of resistors 35, 36, thereby providing via a line 37 a signal which gates on a silicon controlled rectifier (SCR) 38. The value of the resistor 33 establishes the charging rate for the triggering capacitor 32, and may be selected so that the SCR 38 is turned on only after the occurrence of a full ringing signal. In this way the calling party will not be disconcerted by having his call answered without first hearing a ring tone.

The SCR 38 is connected in series with the inductor 14 and the emitter-base junction of a transistor 40 across the output lines 30, 31 of the rectifier bridge 29. Thus after turn-on, conduction of the SCR 38 is maintained by the dc bias supplied from the telephone line 12. Audio signals to or from the telephone line 12 ride on top of the dc bias, and thus are undisturbed in either sense or fidelity by the rectifier bridge 29. Audio connection between the telephone line 12 and the apparatus 10 is accomplished via the terminal 31*a* connected to the line 31.

The inductor 14 presents a low dc impedance and hence does not interfere with the dc bias maintaining conduction of the SCR 38. At audio frequencies the inductor 14 exhibits an impedance (typically 250 ohms) similar to that of the telephone instrument 13. Thus when the SCR 38 conducts, the inductor 14 loads the telephone line 12 in a manner simulating the off-hook condition.

Voltage from the battery 15 is connected to the motor 16 and the amplifier 17 via the emitter-collector path of the transistor 40. In the standby state prior to answering a call, the base of the transistor 40 is held at the same potential as the emitter by a resistor 41. This clamps the transistor 40 off. When the SCR 33 is turned on, the resultant negative voltage supplied from the line 30 to the base of the transistor 40 turns that transistor on. As a result, the positive terminal of the battery 15 is connected via the transistor 40 and the line 42 to the motor 16 and the amplifier 17.

It is possible that during the answering cycle the dc bias on the telephone line 12 may be interrupted, causing premature turn-off of the SCR 38. To prevent this, the negative terminal of the battery 15 is connected via a resistor 43 and a diode 44 to the line 30. The value of the resistor 43 is selected to provide sufficient current to hold the SCR 38 in the conducting state should the bias on the telephone line 12 be interrupted. The diode 44 prevents the telephone line 12 from being loaded by the resistor 43 and the battery 15 during the standby period.

To summarize, occurrence of a ringing signal initiates conduction of the SCR 38. This causes the inductor 14 to load the telephone line, simulating an off-hook condition. It also causes the transistor 40 to go on, connecting power to the device 11 and starting the answering cycle. During the answering cycle dc bias from the telephone line maintains the SCR 38 in conduction. At the end of the answering cycle the SCR 38 is turned off as next described.

When the SCR 38 is conducting there will be a potential difference between the line 30 and the negative terminal of the battery 15. As a result, a capacitor 45 will be charged via a resistor 46. The polarity at the capacitor terminal 45a will be negative with respect to the line 30. At the end of the answering cycle, when the conductive segment 24 on the endless tape 18 reaches the assembly 25, the terminals 25a and 25b will short, connecting the capacitor 45 across the SCR 38. The capacitor 45 will discharge through the SCR 38 with a polarity causing that SCR to turn off.

Although not shown, a resistor may be provided in series with the contacts 25*a*, 25*b* to slow the discharge time of the capacitor 45 and insure turn-off of the SCR 38.

When the SCR 38 ceases conduction, the inductive load 14 is disconnected from the telephone line 12, returning the line to the "on-hook" condition. The transistor 40 also goes off, disconnecting power from the motor 16 and the amplifier 17, thereby terminating the answering cycle.

The control circuit 10 may be used with other telephone answering devices wherein cycle timing is not controlled by an endless tape loop. In such application, the capacitor 45, the resistor 44 and the contacts 25*a*, 25*b* (FIG. 3) may be replaced by a transformer 50 and a blocking capacitor 51 connected across the SCR 38 as shown in FIG. 4. The timing circuitry (not shown) of the answering device provides an input to the primary of the transformer 50 at the end of the answering cycle. The signal induced in the secondary of the transformer 50 is applied across the SCR 38 via the capacitor 51 in the appropriate polarity to terminate conduction of that SCR.

Although a silicon controlled rectifier 38 is shown in FIG. 3, the invention is not so limited. Other semiconductive switching devices could be used, such as a triac or a pair of complementary, back-to-back transistors. As used herein, the term "controlled rectifier" encompasses such alternative devices. Breakdown devices other than the neon lamp 34 could be used to interface the triggering capacitor 32 and the control element of the SCR 38. Further, a component (e.g., a resistor or a transistor connected as a dynamic load) other than the inductor 14 may be used to load the telephone line 12.

Operation of the answering device 11 is inhibited when there remains insufficient tape 21 to record additional incoming messages. For this purpose, the end of the tape 21 is provided with a conductive metal segment 55 (FIGS. 1 and 2). When most of the tape 21 has been filled with incoming messages and accumulated on the take-up reel 23, the conductive segment 55 will short a pair of contacts 56*a*, 56*b*. This connects the emitter to the base of the transistor 40, clamping off that transistor. As a result, the battery 15 will be disconnected from the motor 16 and the amplifier 17. The SCR 38 will remain in conduction, so that inductor 14 will continue to load the telephone line 12. As a result, subsequent callers will receive a busy signal. However since the transistor 40 is off, there will be minimal drain of the battery 15, significantly reducing the likelihood that the battery will leak or become discharged should the message tape 21 remain in the contact-shorting position for a long period of time. Moreover, since power is removed from the motor 16, wear on the tape drive components is minimized.

As an optional feature, the telephone answering device 11 (FIG. 1) may use a stereo record/playback head 19. This would permit two different outgoing messages to be prerecorded on parallel tracks of the same portion of the announcement tape loop 18. An appropriate switch 58 (FIG. 5) may be used to select which track output of the head 19 is to be used, and hence to establish which message is transmitted to the telephone line 12.

The tape loop 18 also may be used for mid-cycle timing. When the conductive segment 24 reaches a different set of contacts 60, appropriate circuitry (not shown) may switch the device 11 from the announcement transmit to the incoming message record mode. The tape loop 18 is guided by four wheels 61, one of which may be spring loaded to maintain constant loop tension.

To clean the record/playback head 19, the tape loop 18 may be provided with a short (typically one-fourth inch), slightly abrasive segment 62. Each time the announcement is transmitted, the segment 62 will clean accumulated debris from the head 19, thereby aiding clear message reproduction. A similar abrasive segment (not shown) may be provided on the incoming message tape 21, near the end including the conductive segment 55, to clean the head 20.

Figure 6:
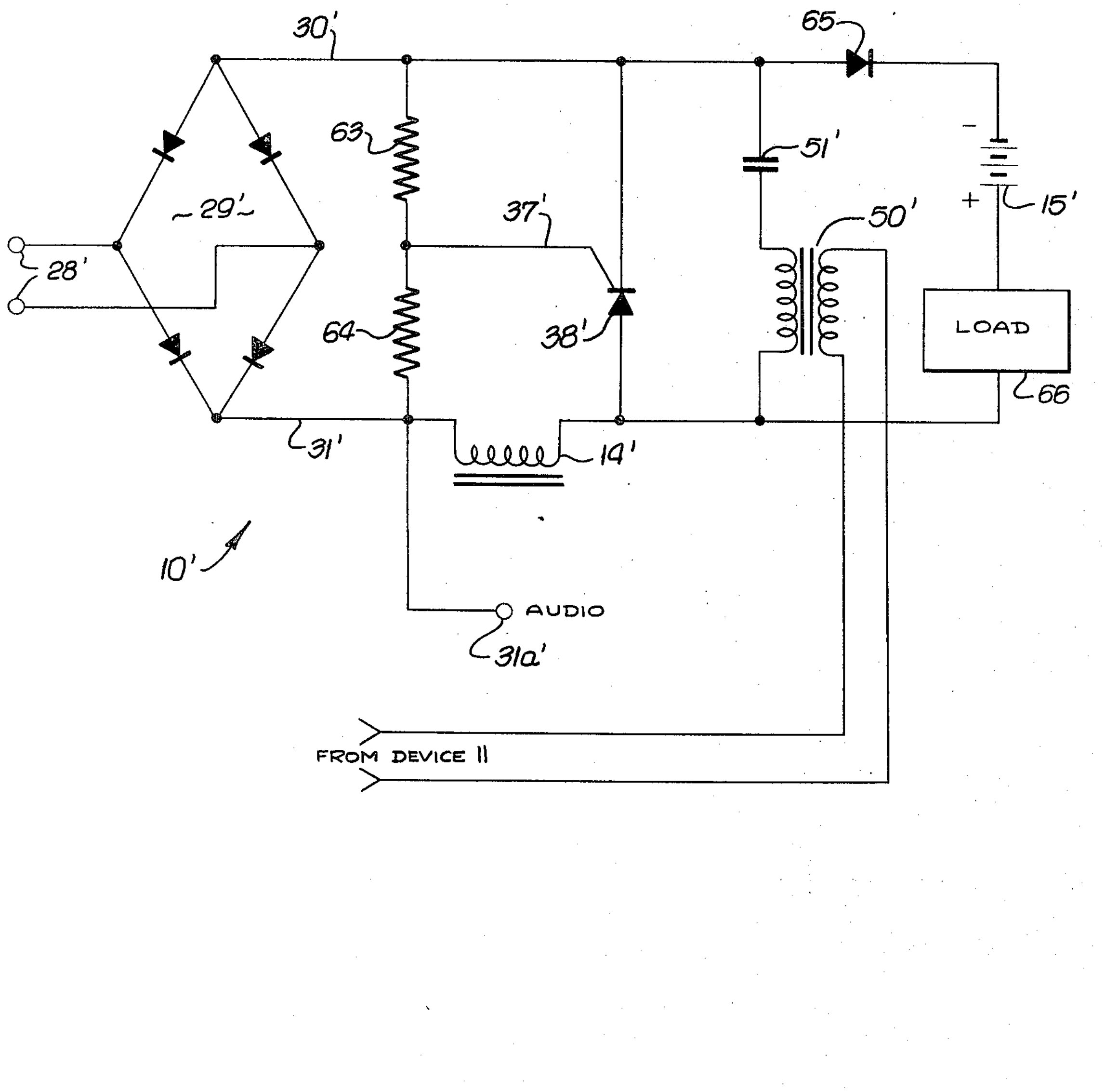
FIG. 6 is an electrical schematic diagram of alternative control circuitry in accordance with the present invention.

In the simplified control circuit 10' of FIG. 6, the components identified by primed numbers correspond to the like numbered, but unprimed, elements of FIGS. 3 and 4. The resistors 63, 64 forming a voltage divider across the bridge 29' output are selected so that the dc bias from the telephone line 12 will yield a voltage on the line 37' insufficient to gate on the SCR 38'. The same dc bias on the line 30' will clamp off the diode 65, thereby preventing current flow from the battery 15' to the load 66 (comprising the motor 16 and the amplifier 17). Receipt of a ringing signal will increase the line 37' voltage sufficiently to turn on the SCR 38', causing the inductor 14' to load the telephone line. Conduction of the SCR 38' also will cause the voltage on the line 30' to drop, resulting in conduction of the diode 65. The battery 15' power thereby is connected to the load 66 via the diode 65 and the SCR 38'. At the end of the answering cycle, a voltage induced by the transformer 50' turns off the SCR 38', with resultant cut-off of the diode 65.

Intending to claim all novel, useful and unobvious features shown or described, the applicant:

1. In a telephone answering device of the type wherein an answering cycle is initiated upon occurrence of a ringing signal on the telephone line, said cycle including the transmission of a prerecorded outgoing message and the subsequent recording of an incoming message, a circuit for initiating said answering cycle comprising:

a controlled rectifier, triggering means for initiating conduction of said controlled rectifier in response to occurrence of said ringing signal, loading circuit means including said controlled rectifier for loading said telephone line when said controlled rectifier conducts, semiconductor switch means, turned on by conduction of said controlled rectifier, for connecting power to other components of said telephone answering device, and turn-off means for applying a reverse polarity voltage across said controlled rectifier to terminate conduction thereof at the end of said answering cycle, said terminated conduction unloading said telephone line and causing said semiconductor switch means to disconnect power from said other answering device components.

2. A circuit according to claim 1 for use in a telephone answering device wherein said answering cycle is timed by a control member on an endless tape loop containing said outgoing message, said turn-off means comprising;

a capacitor charged during said answering cycle, discharge means, actuated by said control member when said endless tape reaches a cycle terminating position, for applying the charge on said capacitor across said controlled rectifier in a polarity causing turn-off thereof.

3. A circuit according to claim 1 wherein said semiconductor switch means comprises a diode in series with a source of power and said controlled rectifier, bias from said telephone line clamping off said diode prior to occurrence of a ringing signal, conduction of said controlled rectifier resulting in conduction of said diode to provide power from said source to said other device components.

4. A circuit according to claim 1 wherein said semiconductor switch means comprises;

a transistor, means connecting the base of said transistor to a non-control element of said controlled rectifier for biasing on said transistor when said controlled rectifier conducts, and means connecting a source of power to said answering device other components via the emitter-collector path of said transistor.

5. A circuit according to claim 1 wherein said triggering means comprises;

a rectifier bridge, said telephone line being connected to the input of said bridge, a triggering capacitor connected to the output of said bridge and charged by the ringing signal rectified by said bridge, and means connecting said triggering capacitor to the control element of said controlled rectifier to initiate conduction thereof when the charge on said triggering capacitor reaches a certain level, dc bias from said telephone line thereafter maintaining conduction of said controlled rectifier.

6. A circuit according to claim 5 wherein said means connecting comprises;

a neon lamp connected to fire when the charge on said triggering capacitor exceeds the firing point of said lamp, and means for applying the firing current of said neon lamp to the control element of said controlled rectifier to initiate conduction thereof.

7. A circuit according to claim 5 further comprising;

means for maintaining conduction of said controlled rectifier during said answering cycle despite absence of dc bias from said telephone line.

8. A circuit according to claim 5 wherein said loading circuit comprises;

a loading element simulating the load characteristics of a telephone series connected with said controlled rectifier across the output of said rectifier bridge.

9. In a telephone answering device of the type wherein a prerecorded outgoing message is delivered from one recording medium to the telephone line and an incoming message subsequently is recorded on another medium, said answering device including means establishing the duration of said answering cycle, a circuit for starting and ending said answering cycle comprising:

a. a rectifier bridge connected across said telephone line, b. a controlled rectifier, c. triggering means connected to the output of said bridge and to the control element of said controlled rectifier for turning on said controlled rectifier in response to occurrence of a ringing signal on the telephone line, dc bias from said telephone line thereafter maintaining conduction of said controlled rectifier during said answering cycle, d. an inductor effectively connected in series with said controlled rectifier across the output of said bridge to load said telephone line when said controlled rectifier is on, e. a source of power for other components of said answering device, f. a transistor, the base of said transistor being connected to a non-control element of said controlled rectifier to bias on said transistor when said controlled rectifier is on, said source of power being connected to said other components via the emitter-collector path of said transistor, and g. turn-off means for terminating conduction of said controlled rectifier at the end of said answering cycle.

10. A circuit according to claim 9 wherein said triggering means comprises;

a trigger capacitor connected across the output of said bridge, said trigger capacitor being charged to a first level by the dc bias on said telephone line and charged to a higher level by said ringing signal, and means operatively connected to discharge said trigger capacitor and thereby provide a trigger signal to the control element of said controlled rectifier only when the charge on said trigger capacitor reaches said higher level.

11. A circuit according to claim 10 wherein the base and another element of said transistor are connected in series between said inductor and said rectifier non-control element, a current path thereby being provided from one output terminal of said rectifier bridge through said inductor, a junction of said transistor, and said controlled rectifier to the other output terminal of said rectifier bridge, said source of power also being connected to said transistor other element.

12. A circuit according to claim 11 for use in a telephone answering device wherein said other medium comprises a magnetic tape, the end of said tape having a control element, said circuit further comprising;

means for preventing said transistor from connecting said source of power to said other components upon detection of said control element, thereby inhibiting operation of said telephone answering device when insufficient magnetic tape remains for recording additional incoming messages.

* * * * *